United States Patent

[11] 3,585,963

| [72] | Inventor | Jan A. Hiszpanski |
| | | Chicago, Ill. |
| [21] | Appl. No. | 834,420 |
| [22] | Filed | June 18, 1969 |
| [45] | Patented | June 22, 1971 |
| [73] | Assignee | I-T-E Imperial Corporation |

[54] FLUID INDICATOR
19 Claims, 8 Drawing Figs.

[52] U.S. Cl. .................................................. 116/117,
23/253, 73/29, 277/117
[51] Int. Cl. .................................................. G01f 15/00
[50] Field of Search ........................................... 116/117;
73/73, 326, 330, 298, 334, 29; 23/253; 277/110,
115, 117, 177

[56] References Cited
UNITED STATES PATENTS

| 1,159,764 | 11/1915 | Heller | 116/117 UX |
| 2,624,308 | 1/1953 | Wittlin | 116/117 |
| 2,655,124 | 10/1953 | Gary et al. | 116/117 |
| 2,714,868 | 8/1955 | Franck | 116/117 |
| 2,725,844 | 12/1955 | Wittlin | 116/117 |
| 2,976,124 | 3/1961 | Wittlin | 23/253 |
| 3,088,811 | 5/1963 | Jones | 23/253 |
| 3,122,124 | 2/1964 | Yocum | 116/117 |
| 1,955,831 | 4/1934 | Raybould | 227/115 X |
| 2,322,660 | 6/1943 | Parsons | 73/298 |
| 3,345,872 | 10/1967 | Meginnis | 73/334 |
| 2,843,078 | 7/1958 | Wittlin | 116/117 |
| 3,046,097 | 7/1962 | Wittlin | 23/253 |
| 3,100,691 | 8/1963 | Jones | 23/253 |

FOREIGN PATENTS

| 480,395 | 5/1916 | France | 73/326 |

*Primary Examiner*—Louis J. Capozi
*Attorney*—Hofgren, Wegner, Allen, Stellman and McCord

ABSTRACT: A fluid indicator providing an indication of the absence or presence of a fluid in a system and the presence of moisture in the fluid. The indicator includes means for connecting the same in a fluid line permitting fluid flow therethrough. The indicating means are carried within the indicator and are observable through suitable openings in the outer wall of the indicator. The indicator includes improved sealing means. Further, the indicator includes an improved visual indication of the absence of fluid in the indicator and an improved visual indication of the moisture condition thereof.

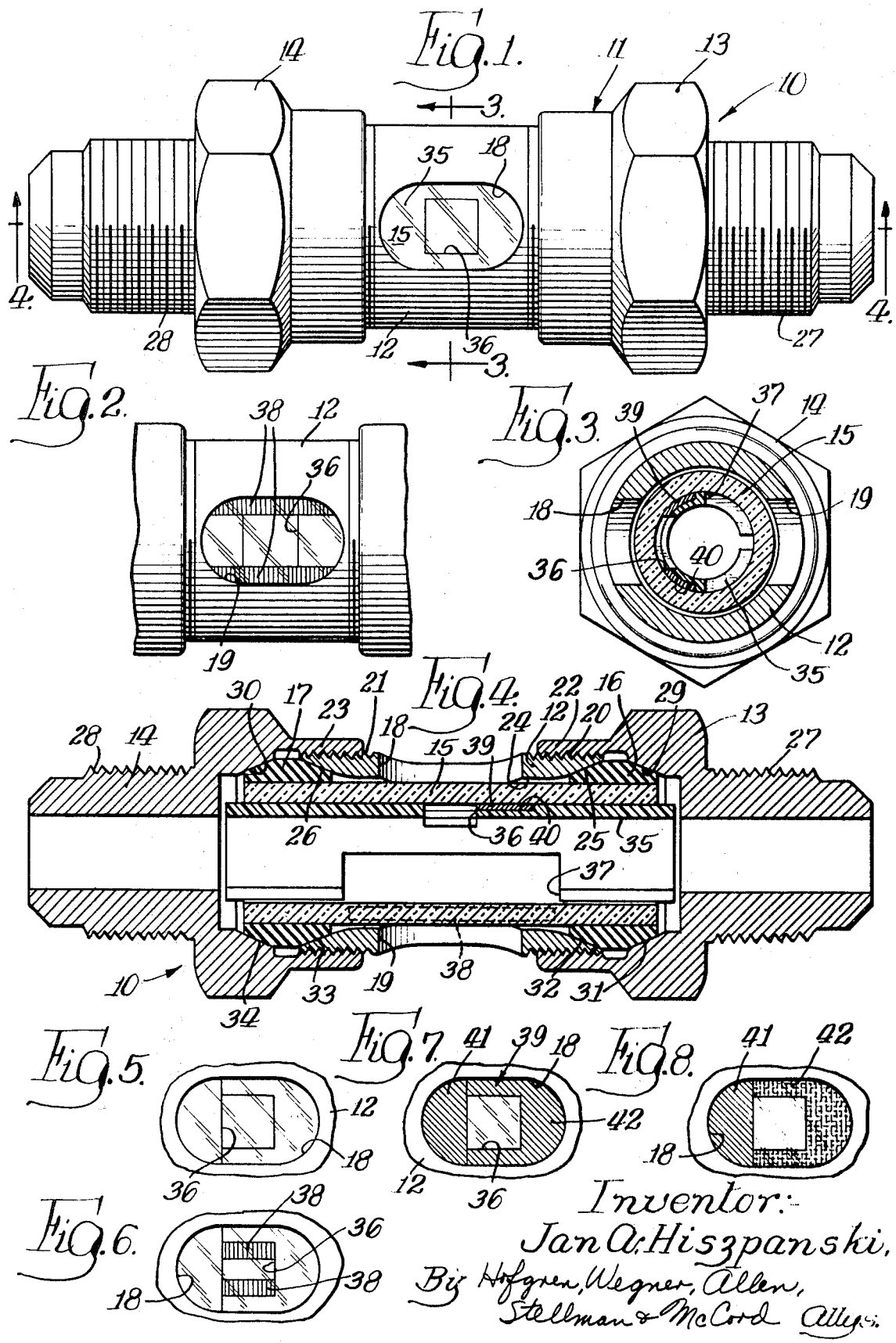

FLUID INDICATOR

BACKGROUND OF THE INVENTION

1. Field of the Invention

This invention relates to fluid indicators and in particular to fluid indicators for indicating the absence or presence of the fluid and a moisture condition of the fluid.

2. Description of the Prior Art

A number of fluid indicators are known in the art having means for indicating different fluid conditions in the fluid flowed through the indicator. The known indicators have serious limitations in not effectively positively indicating the fluid conditions. Another disadvantage of the known indicators is the impositive sealing of the elements. A further disadvantage of the known indicators is the possibility of washing out of the indicator material.

Still further, there is a need for improved reference comparison means permitting the user to compare the condition of the indicator with a reference so as to readily determine a variation in the fluid condition from the desired condition.

SUMMARY OF THE INVENTION

The present invention comprehends an improved fluid indicator eliminating the above discussed disadvantages of the known fluid indicators in a novel and simple manner.

More specifically, the invention comprehends the provision of a fluid indicator having new and improved means for indicating different fluid conditions in the fluid provided within the indicator. The indicating means include improved means for indicating the absence or presence of fluid in the indicator and new and improved means for indicating a moisture condition of the fluid.

The invention comprehends the provision of a fluid indicator having separable parts and an improved seal for sealing the parts against loss of fluid from the indicator. More specifically, the seal comprises a sleeve which is axially and radially constricted by adjustment of a pair of housing elements to effect the desired sealing of the indicator. The seal is further arranged to comprise the sole support of a glass tube portion of the indicator permitting relative displacement between the glass tube and the metal portions of the indicator as may occur from different thermal expansions of the glass and metal parts.

The means for indicating the absence or presence of fluid in the indicator comprises a surface juxtaposed to one of a pair of diametrically opposed openings which surface is observable through the other opening only when fluid is absent from the indicator. The surface means comprises in the illustrated embodiment a painted portion of the glass tube.

The means for indicating the moisture condition of the fluid comprises a structure defining a surround of one of the openings which has a single appearance when moisture is absent from the fluid and which has portions presenting different appearances when moisture is present in the fluid. The indicator is arranged so that the means for indicating the absence or presence of fluid in the indicator is observable through the midportion of the means for indicating the moisture condition of the fluid.

BRIEF DESCRIPTION OF THE DRAWING

Other features and advantages of the invention will be apparent from the following description taken in connection with the accompanying drawing wherein:

FIG. 1 is a front elevation of a fluid indicator embodying the invention;

FIG. 2 is a fragmentary rear elevation thereof;

FIG. 3 is a transverse section thereof taken substantially along the line 3-3 of FIG. 1;

FIG. 4 is a diametric section thereof taken substantially along the line 4-4 of FIG. 1;

FIG. 5 is a fragmentary front elevation illustrating the arrangement of the means for indicating the absence or presence of the fluid, when the fluid is present;

FIG. 6 is a fragmentary elevation thereof when the fluid is absent;

FIG. 7 is a fragmentary elevation showing the means for indicating the moisture condition of the fluid when the fluid is dry; and FIG. 8 is a fragmentary elevation thereof showing the arrangement when the fluid is wet.

DESCRIPTION OF THE PREFERRED EMBODIMENTS

In the exemplary embodiment of the invention as disclosed in the drawing, a fluid indicator generally designated 10 is shown to comprise a duct 11 for conducting fluid flow therethrough. In illustrating the invention, the indicator will be described as for use in indicating the conditions of a liquid fluid, such as a liquid refrigerant fluid, it being understood that the indicator is adapted for similar use with other fluids both gaseous and liquid.

The duct 11 includes a tubular body 12, connecting means in the form of a pair of connectors 13 and 14 at the opposite ends of the body 12, a transparent annular member 15 and sealing means in the form of a pair of sealing sleeves 16 and 17. The body 12 is provided with a pair of diametrically aligned openings 18 and 19 permitting the user to observe the interior of the duct 11.

The body 12 further defines a pair of external threads 20 and 21 at the opposite ends thereof adapted to be threadedly engaged by threaded portions 22 and 23 at the inner ends of the connectors 13 and 14. The bore 24 of the body 12 is defined at its opposite ends by outwardly widening frustoconical sealing surfaces 25 and 26.

The connectors 13 and 14 further define external threads 27 and 28 for threaded engagement with the means to which the indicator is to be coupled. Connector 13 further defines an inwardly opening frustoconical camming surface 29 and connector 14 further defines an inwardly opening frustoconical camming surface 30.

The sealing sleeve 16 defines at its opposite ends a pair of frustoconical sealing surfaces 31 and 32 cooperating with sealing surfaces 25 and 29 of the body 12 and connector 13 respectively to seal the glass tube 15 to the connector 13 and the body 12.

Sealing sleeve 17 defines at its opposite ends a pair of sealing surfaces 33 and 34 engaged by sealing surface 26 of body 12 and sealing surface 30 of connector 14.

Sealing means 16 and 17 are caused to have positive sealing engagement with the associated indicator elements by the constrictive forces generated by the threading of connector 13 on body threads 20 and connector 14 on body threads 21. Thus, as best seen in FIG. 4, when the connector 13 is advanced on thread 20, connector sealing surface 29 bears forcibly against seal surface 31 urging this portion of the seal to the left and thereby urging seal surface 32 forcibly against body seal surface 25. Thus, the seal is axially constricted and resultingly also radially constricted to provide a positive seal between the glass member 15, the connector 13, and the body 12. The same constrictive sealing effect is obtained with seal 17 by the advance of connector 14 on the body thread 21. Thus, as can best be seen in FIG. 4, the glass member 15 is supported solely by the resilient seals 16 and 17 to permit relative displacement between the glass member 15 and the indicator elements 12, 13 and 14 without affecting the positive seal. Illustratively, the sealing means 16 and 17 may be formed of a suitable rubber and the indicator elements 12, 13, and 14 may be formed of a suitable metal, such as brass.

The indicator further includes a tubular support 35 fitted within the glass tube 15. The support is provided with an opening 36 which in the illustrated embodiment is square. Diametrically opposite opening 36 the support is provided with a larger opening 37, which is preferably elongated, parallel to the axis of the indicator. Thus, when the user looks through the opening 36, he may see light passing through the diametrically opposite portion of the glass member 15 and opposite opening 37.

To indicate the absence or presence of fluid in the indicator 10, a pair of colored bands 38 is provided on glass member 15 adjacent opening 37. As best seen in FIG. 3, the bands 38 extend across the upper and lower portions of the opening 19. The bands, however, are spaced apart sufficiently so that when the fluid is present in the indicator, the bands 38 will not be seen through the opening 36 as shown in FIG. 5. However, when the fluid is absent from the indicator, the refraction of the light causes the bands to be observable in the upper and lower portions of the opening 36 as shown in FIG. 6. The bands 38 may comprise surfaces applied directly on glass member 15 such as by painting or the like, or may comprise elements affixed to the glass member such as in the form of a decal having the bands provided thereon.

The moisture condition of the fluid in indicator 10 is indicated by a moisture indicator element 39 carried in a suitable outwardly opening recess 40 in the tubular support 35. A portion of support 35 defines a reference portion 41 adjacent the indicator element 39. As best seen in FIG. 7, the indicator element 39 and reference portion 41 cooperatively define a surround about opening 36. Illustratively, the indicating element 39 may comprise a U-shaped sheet of paper, or the like, impregnated with a suitable indicator chemical such as cobalt chloride. In its dry condition, the appearance of indicator element 39 is preferably substantially similar to that of reference portion 41. However, when moisture is present in the indicator 10, the indicator element 39 becomes altered in appearance to contrast with the fixed appearance of reference 41, such as shown in FIG. 8. Illustratively, where the indicator chemical comprises cobalt chloride, the indicator element 39 changes from green to yellow in the presence of moisture. In the illustrated embodiment, where the fluid to be indicated comprises conventional freon refrigerant fluid, the indicator serves to indicate the presence of moisture in the fluid of from 5 to 30 parts per million by weight. In the illustrated embodiment, the bands 38 may comprise red bands and, thus, the indicator utilizes the contrasting colors of red, green, and yellow in providing the improved indicating function. Obviously, within the scope of the invention, other colors and chemical indicators may be employed as desired.

By virtue of the improved recessed arrangement of the indicator element 39, washing out of the impregnating chemicals is effectively avoided. The support 35 positively supports the indicator 39 over the entire rear surface thereof and maintains the indicator in accurate disposition relative to the opening 36.

The foregoing disclosure of specific embodiments is illustrative of the broad inventive concepts comprehended by the invention.

I claim:
1. A fluid indicator comprising:
a tubular body having a pair of diametrically aligned openings;
connecting means adjustably associated with said body for connecting the body in a fluid line for conducting a fluid therethrough;
a transparent annular member within the body and extending across said openings;
sealing means responsive to adjustment of said connecting means relative to said body to seal said annular member to said connecting means; and
indicator means associated with said member for indicating a fluid condition by observation thereof through at least one of said openings.

2. The fluid indicator of claim 1 wherein said sealing means comprises a resilient sleeve having frustoconical, opposite outer end surfaces, and said body and connecting means include complementary frustoconical camming surfaces engaging said sleeve surfaces and forcibly axially and radially constricting said sleeve to provide a resilient seal therebetween.

3. The fluid indicator of claim 1 wherein said sealing means is arranged to provide the sole support of said annular member.

4. The fluid indicator of claim 1 wherein said sealing means carries said annular member to permit said annular member to have different thermal expansions and contractions relative to said connecting means while effectively positively maintaining the seal therebetween.

5. The fluid indicator of claim 1 wherein said indicator means comprises means for concurrently indicating the presence and moisture condition of fluid in said indicator.

6. A fluid indicator comprising:
means defining a fluid receiving chamber having a pair of observation openings aligned across a portion of the chamber;
transparent means extending across each of said openings; and
indicator means for indicating the absence of the fluid from said chamber defined by an indication surface juxtaposed to one of said openings and observable through the other opening only when said fluid is absent from said chamber.

7. The fluid indicator of claim 6 wherein said indication surface is visually surrounded means defining a surface, said indication surface having a contrasting color with respect to the surrounding surface.

8. The fluid indicator of claim 6 wherein said indicator means comprises means defining a pair of indicator surfaces at opposite sides of said one opening.

9. The fluid indicator of claim 6 wherein said indicator means is provided on said transparent means.

10. A fluid indicator comprising:
means defining a fluid receiving chamber having a pair of observation openings aligned across a portion of the chamber;
transparent means extending across each of said openings; and
indicator means for indicating the presence of moisture in the fluid in said chamber defined by a surround of one of said openings having one portion presenting a substantially constant preselected appearance and another portion presenting selectively a first appearance similar to said preselected appearance of said one portion and a second appearance contrasting with said preselected appearance of said one portion as the result of moisture being present in said fluid in the chamber.

11. The fluid indicator of claim 10 wherein said another portion comprises the remainder of said surround whereby said surround has effectively a single appearance in the absence of moisture in the fluid in the chamber.

12. The fluid indicator of claim 10 further including means observable in the opening within said surround for indicating the absence of fluid from said chamber.

13. The fluid indicator of claim 12 wherein said last named means has a color differing from that of said moisture indicating surround.

14. The fluid indicator of claim 10 including a support for carrying said another portion of the indicator means and said one portion of the indicator means comprises a portion of said support.

15. The fluid indicator of claim 14 wherein said another portion of the indicator means is U-shaped.

16. In a fluid indicator having a tubular body having a pair of diametrically aligned openings, connecting means adjustably associated with said body for connecting the body in a fluid line for conducting a fluid therethrough, and a transparent annular member within the body and extending across said openings, indicator means comprising: first indicating means carried by said indicator for use in providing an indication of the absence or presence of a preselected fluid in the indicator; and second indicating means carried by said indicator for providing an indication of the presence of moisture in said fluid and cooperating with said first indicating means to provide said indication of the absence or presence of said fluid.

17. The fluid indicator of claim 16 wherein said indicator means comprises an indicium observable through one of said openings only when said fluid is absent from said indicator.

18. The fluid indicator means of claim 16 wherein said second indicating means defines a window selectively hiding or exposing said first indicating means as a function of the presence or absence of said preselected fluid in said fluid indicator.

19. The fluid indicator means of claim 16 wherein the arcuate cover element is provided with said transparent member and said second indicating means includes a surface viewable through one of said openings and is disposed between said transparent member and said arcuate cover element to preclude flow of said fluid over said surface of the second indicating means.